United States Patent [19]
Grandin

[11] Patent Number: 5,906,540
[45] Date of Patent: May 25, 1999

[54] ANIMAL STUNNING SYSTEM PRIOR TO SLAUGHTER

[75] Inventor: Temple Grandin, Ft. Collins, Colo.

[73] Assignee: Monfort, Inc., Greeley, Colo.

[21] Appl. No.: 09/012,891

[22] Filed: Jan. 23, 1998

[51] Int. Cl.[6] .................................................. A22B 3/06
[52] U.S. Cl. ............................................................ 452/58
[58] Field of Search ................................ 452/58, 57, 54

[56] References Cited

U.S. PATENT DOCUMENTS

| | | | |
|---|---|---|---|
| 2,621,362 | 12/1952 | Cosden | 452/58 |
| 2,879,539 | 3/1959 | Cervin | 452/58 |
| 3,599,276 | 8/1971 | Edwards . | |
| 3,657,767 | 4/1972 | Schmidt, Jr. . | |
| 4,031,591 | 6/1977 | Collins . | |
| 4,338,700 | 7/1982 | Nijhuis . | |
| 4,361,932 | 12/1982 | Nijhuis . | |
| 4,524,487 | 6/1985 | Goossens . | |
| 4,531,322 | 7/1985 | Termet . | |
| 4,571,777 | 2/1986 | Nijhuis . | |
| 4,575,900 | 3/1986 | Hamel et al. . | |
| 4,578,841 | 4/1986 | Nijhuis . | |
| 4,586,216 | 5/1986 | Grajoszex . | |
| 4,747,184 | 5/1988 | Winsloe . | |
| 4,747,185 | 5/1988 | Thacker . | |
| 4,780,932 | 11/1988 | Bowman et al. . | |
| 4,875,253 | 10/1989 | Lambooy . | |
| 4,953,263 | 9/1990 | Lambooy . | |
| 5,326,307 | 7/1994 | Bernardus et al. | 452/58 |
| 5,401,209 | 3/1995 | Ripol et al. | 452/58 |
| 5,486,145 | 1/1996 | Dorsthorst et al. | 452/58 |
| 5,595,444 | 1/1997 | Tong et al. | 374/45 |
| 5,704,830 | 1/1998 | Van Ochten | 452/58 |

FOREIGN PATENT DOCUMENTS 177787   4/1986   European Pat. Off. ............ 452/58

*Primary Examiner*—Willis Little
*Attorney, Agent, or Firm*—Sheridan Ross P.C.

[57] ABSTRACT

An electronic animal stunning system is disclosed, wherein animals can be continuously stunned while being moved through a stunning passageway, and wherein the current for the stunning process utilizes a series of electrodes for sequentially contacting the animal to be stunned and providing the stunning current. In particular, a series of pivotally mounted overhead electrode paddles are provided, wherein each paddle in the series of paddles pivots when contacted by the animal's head and slides across the face of the animal's head thereby setting up an electric current through the animal's head. The present invention is particularly useful for the slaughtering of hogs.

8 Claims, 3 Drawing Sheets

5,906,540

ANIMAL STUNNING SYSTEM PRIOR TO SLAUGHTER

FIELD OF THE INVENTION

The present invention relates to the stunning of animals for slaughter at, for example, a meat packing facility; and in particular, to an electrical stunning system wherein the stunning current automatically migrates through a series of stunning electrodes during the stunning process.

BACKGROUND OF THE INVENTION

There have been numerous techniques for stunning of animals prior to slaughter. The techniques currently in use, however, have a number of deficiencies. In particular, such techniques have one or more of the following drawbacks:

(1.1) The animals may have to be stationary during the stunning process. This means that each animal has to be effectively confined and that continuous conveyance is not possible. Thus, the number of animals stunned may be lower than desired.

(1.2) The animals may have to be in a relatively precise position for effective stunning to be performed. Accordingly, a reduced number of animals may be effectively stunned because of the time spent assuring that each animal is properly positioned.

(1.3) Some existing stunning systems are expensive and electrically/mechanically sophisticated and thus, subject to malfunctions due to the utilization of stunning electrodes that must be capable of moving with an animal throughout the stunning process.

Accordingly, it would be desirable to have an animal stunning system that alleviated the difficulties described hereinabove. In particular, it would be desirable to have a stunning system that:

(2.1) Allows the stunning of animals while they are being conveyed to the killing floor.

(2.2) Does not require the animal to be precisely positioned for effective stunning to occur.

(2.3) Does not require sophisticated mechanical and/or electronic devices having pairs of current-completing stunning electrodes that must move with the animal throughout the stunning process.

SUMMARY OF THE INVENTION

The present invention is a mammal stunning system for electrically stunning animals prior to slaughter. The stunning system of the present invention utilizes a series of at least partially solid (i.e. non-liquid) electrodes that are fixedly attached within an animal stunning passageway such that the electrodes are successively encountered by an animal as the animal is moved through the passageway. More particularly, each such at least partially solid electrode is capable of maintaining contact with the animal through a corresponding portion of the passageway adjacent to a particular electrode, and the various electrodes are arranged so that each electrode's contact with the animal overlaps substantially with an immediately previous electrode in the series and with an immediately following electrode in the series. Thus, the present invention provides the capability for an electrical current sufficient to stun an animal to be applied continuously through a passageway with the electrodes of the series being fixedly attached within the passageway.

In one embodiment, the present invention provides the above-described functionality by providing each of the electrodes of the series of stunning electrodes on a corresponding overhead stationary pivot bar so that each electrode has a free end that is capable of pivoting in the direction of movement of the animal when the electrode is encountered by the animal. Thus, by inducing a sufficiently high electrical potential on the electrodes in the series as they successively contact the animal, and by also having an additional stunning current completing electrode contacting the animal with each electrode of the series, an electric current path through the animal can be provided. That is, a continuous stunning current can be provided that flows through the animal even though no electrode in the series continuously maintains contact with the animal through the stunning process.

Moreover, in one embodiment of the present invention, the electrodes of the series are positioned so that they successively contact the head of the animal and the additional stunning current-completing electrode(s) contacts a side of the animal. More precisely, the additional electrode generally contacts an area providing a current flow through the animal that reduces the damage to the high value meat-bearing portions of the animal. In particular, when the present invention is applied to stunning hogs, the additional circuit-completing electrode(s) may be provided substantially at a shoulder of each hog so that the stunning current flows through the head and the shoulder without damaging high value meat sections, such as the pork loins.

In one embodiment of the present invention, each electrode in the series of electrodes is configured in the form of a paddle that is pivotally attached above an animal conveying apparatus (e.g., a conveying track for at least partially supporting the animal via the animal straddling the track) within the stunning passageway so that each paddle pivots in the direction of movement of the animal when contacting the animal. Moreover, such paddles may have a dielectric encompassing free end and an electrically conductive electrode within a center portion of the paddles. The center portion is intended to initially contact the animal's head for activating a stunning current therethrough, but as the animal moves past the paddle, only the free end of the paddle contacts the neck and back of the animal and therefore no current flows through the animal from the paddle. Accordingly, this embodiment is particularly advantageous in that each of the electrodes in the series of paddles can be maintained continuously at a stunning current electrical potential. Thus, no current sequencing and/or on/off current switching electronics are required to vary the electrical potential of the paddle electrodes.

In another embodiment, the electrical current will pass from the series of paddles which contact the head to another series of electrodes which will contact either the animal's shoulder or front legs. This will be called the body sequence of electrodes. As the animal's shoulder or front legs pass against this body sequence of electrodes, the electrical stunning current will automatically migrate successively through the electrode series so that the passage of current remains at approximately the same location on animal's shoulders or front legs.

DETAILED DESCRIPTION OF THE PREFERRED EMBODIMENT

Figure 1:
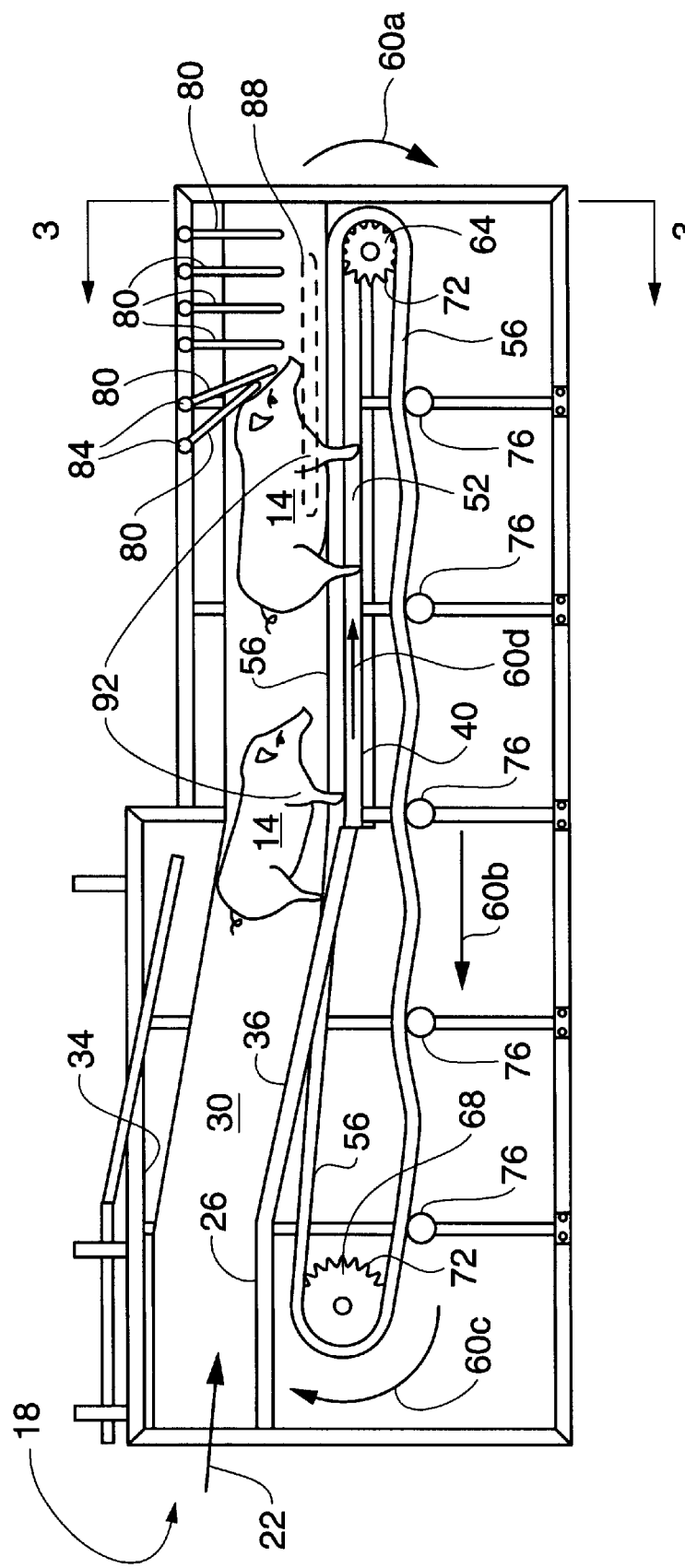
FIG. 1 shows a side view of an embodiment of the present invention for stunning hogs 14.

FIG. 1 illustrates an overall view of a mammal stunning device of the present invention. In particular, the present figure shows an interior side view of the an animal stunning apparatus. More particularly, the FIG. 1 shows a hog stunning embodiment where the front most side panel has been removed so that the internal components can be illustrated. Accordingly, the hogs 14 enter a passageway 18 as shown by arrow 22. The passageway 18 has a floor 26, side panels 30 (only one such panel being shown in this figure), and a ceiling 34. Note that the floor 26 preferably changes from initially being substantially horizontal to an incline portion 36 and subsequently to another substantially horizontal portion 40.

When the hogs 14 enter the passageway 18, the side panels 30 are such that the passageway 18 has a width between the side panels that require the hogs entering the passageway to remain in single file, one behind the other. Further, note that the side panels 30 may be adjustable depending on the size of the hogs (or other mammals). There can be numerous mechanisms for adjusting the width between the side panels 30 as one skilled in the art will appreciate. For example, mechanical, pneumatic or hydraulic mechanisms can be used to perform this function and all such modifications should be understood to be within the scope of the present invention. Accordingly, referring to FIG. 3, wherein an end view (along line-of-sight arrows labeled 3 in FIG. 1) is provided, the side panels 30 are urged inwardly by, for example, pneumatic cylinder assemblies 44 having a shaft extension 48 for urging the side panels 30 toward one another.

Figure 3:
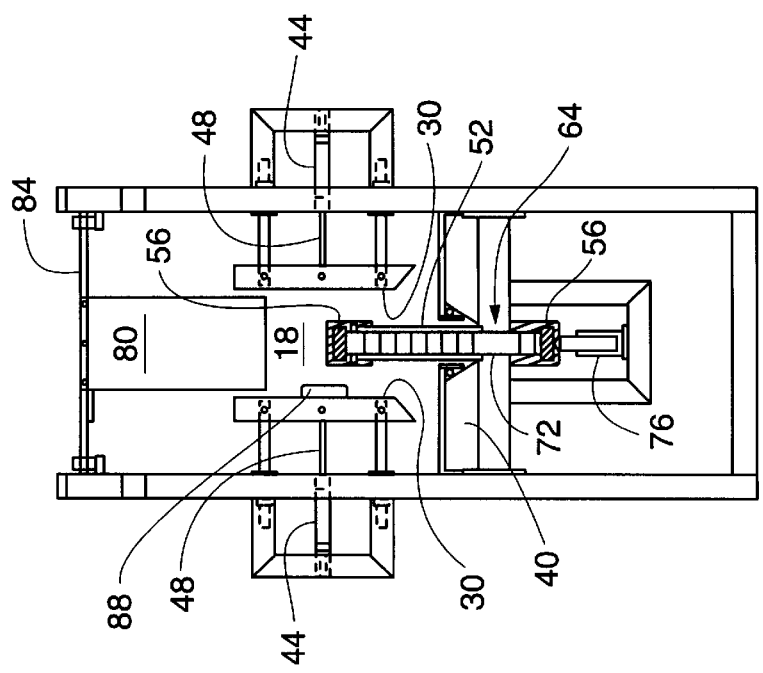
FIG. 3 shows an end view of the stunning passageway 18 according to cross-sectional viewing lines 3 shown in FIG. 1.

Referring again to FIG. 1, when the hogs 14 reach the horizontal portion of the floor 40, the hogs 14 are required to straddle a hog belly support partition 52 (also shown in FIG. 3). Accordingly, as the hogs 14 are urged to progress further along the horizontal portion 40, the hog belly support partition 52 supports the hogs 14 effectively for further moving them through the pathway 18. In particular, the hog belly support partition 52 has an endless track 56 upon which the hogs 14 are at least partially supported, and which rotates according to direction arrows 60*a,b,c,d*. That is, the endless track 56 rotates about the two cogged wheels 64 and 68, wherein cogged wheel 64 is generally the drive wheel and the cogs 72 mate with cog recesses within the interior of endless track 56. Note that when the endless track 56 is traveling in the direction of arrow 60*b*, it is supported by a plurality of support rollers 76 for thereby assuring that the endless track is appropriately supported when traveling in the direction of arrow 60*b*.

Figure 2:
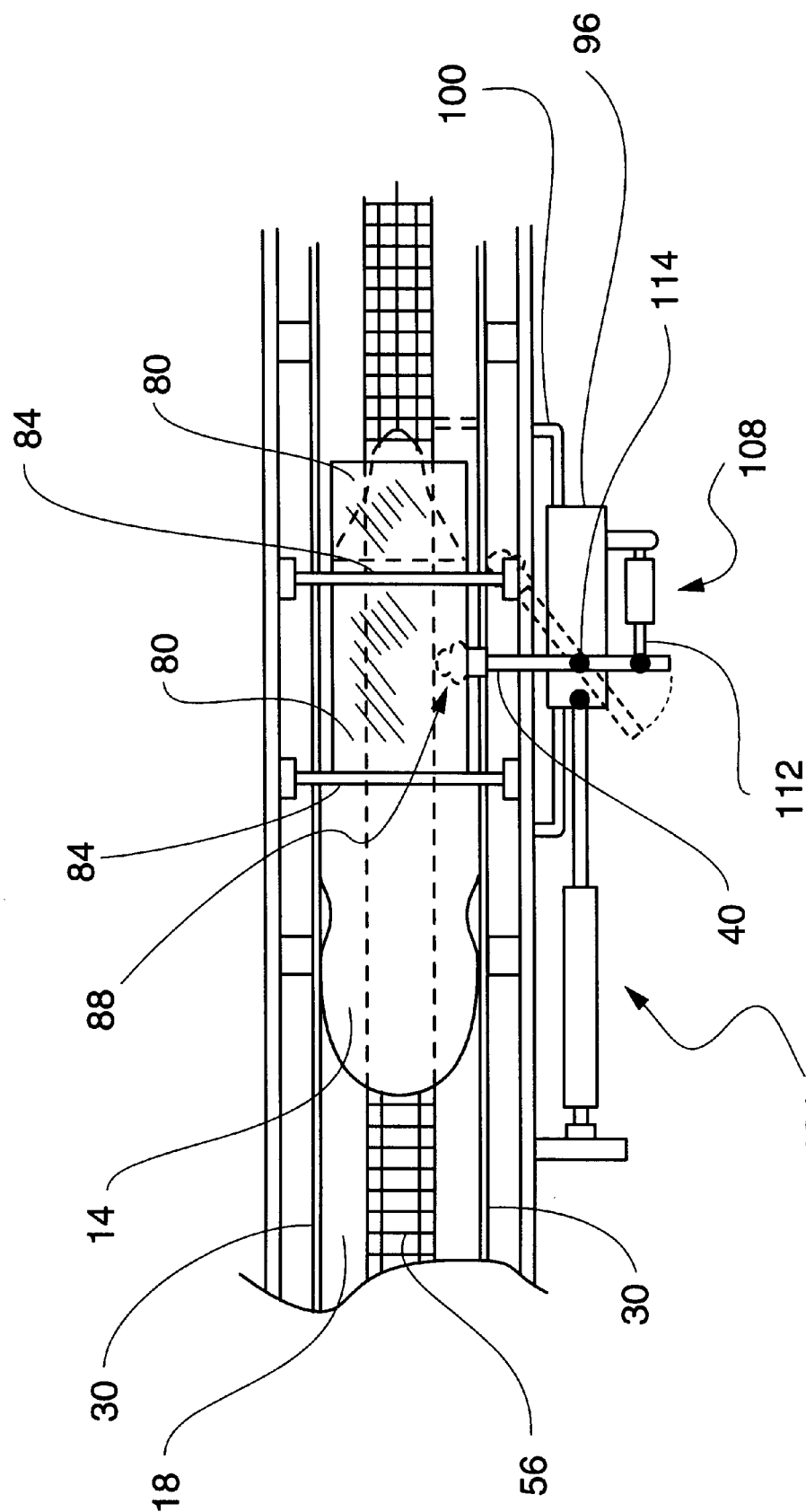
FIG. 2 shows a top view of a portion of the stunning passageway 18 of the present invention, wherein a hog 14 encounters two electrodes of a series of spaced-apart pivotally mounted electrodes 80 that are attached above the height of a hog's head. Further, this figure shows an additional electrode 88 that is used to establish a stunning current through the hog 14, wherein this additional electrode 88 moves with the hog during the stunning process.

As the hogs 14 proceed further into the passageway 18 having the horizontal floor portion 40, the hog's head encounters a sequence of electrodes having at least a portion thereof in a solid state (as opposed to a liquid or gas state). In particular, the hog's head encounters a sequence of stunning paddles 80 that are pivotally attached on pivot bars 84 (best shown in FIGS. 2 and 3) so that each paddle 80 is capable of pivoting freely about its corresponding pivot bar 84 and thereby capable of being moved when encountered by the hog's head. Further note that the stunning paddles 80 are spaced apart approximately no further than the length of the hog's head along the length of the passage 18. Thus, this assures that stunning through the hog's head will continuously occur even though the electrical stunning current flows through successively different paddles 80 as the hog moves through the passageway 18.

The stunning paddles 80 are provided with an electrical potential suitable for stunning hogs. Such electrical potential can be adjusted for effectively stunning other animals such as cattle and sheep. Moreover, other electrodes are within the scope of the present invention. For example, alternative embodiments for the electrodes of the sequence of electrodes may include suspended chains or other segmented or flexible objects that allow a portion of the electrode to properly contact the hog's head for inducing a stunning current therethrough.

In one embodiment, the stunning paddles 80 are provided with an electrical potential when rotated a sufficient angle about its corresponding pivot bar 84 so that there is likely to be effective contact with the hog's head prior to current activation. Accordingly, as the hog's head encounters each successive one of the stunning paddles 80, an electrical current may be induced to flow through the hog's head, thereby stunning the hog. Note that for the current to flow through the hog from the stunning paddles 80, an additional complementary one or more circuit completing electrodes are required. Accordingly, in one embodiment, a single elongate additional electrode 88 (dashed in FIG. 1) is provided for continuously contacting, for example, the shoulder portion 92 of each hog 14 when the hog's head sequentially contacts the paddles 80. Sequencing of the electrical current prevents the current from passing through the ham and loin where the most expensive meat is located. Sequencing also makes it possible to maintain an uninterrupted flow of electricity from an electrode assembly that does not travel with the animal's movement. Both research and practical experience has shown that stopping and starting the current flow during the stun will increase hemorrhages in the meat. Thus, the stunning electrical current flows between the hog's head and the shoulder portion 92 during the stunning operation. Note that the flow of current through the hog according to the present invention reduces the damage to the hog in comparison to other pathways for stunning current through hogs. In particular, it is believed that such electrical paths as provided by the present invention reduce tissue damage because automatic sequencing of the electrical current makes it possible to maintain an uninterrupted current flow from a series of either stationary or pivoting or spring loaded electrodes which do not move with the animal throughout the stunning process. Passage of the electrical current through the front section of the hog may reduce meat damage by avoiding the application of electricity to the most valuable parts of the hog carcass.

Figure 5:
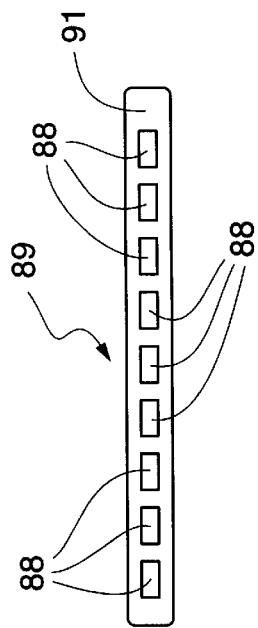
FIG. 5 shows a side view of a hog side contacting electrode assembly 89.

Note that the additional electrode 88 is shown in FIG. 3 as attached to one of the side panels 30 for thereby pressing against the shoulder of a hog. Other embodiments, however, are also within the scope of the present invention. In particular, reference is made to FIG. 2, which shows a top view of a portion of the passageway 18 having stunning paddles 80 positioned therein. In particular, the present figure shows an embodiment of an additional one or more electrodes 88 that protrude from a side panel 30 into the passageway 80 for thereby contacting the hog 14. In particular, these electrodes 88 may be provided in an electrode sequence assembly 89 as is illustrated, for example, in FIG. 5, wherein the electrodes 88 are spaced apart along a hog 14 contacting face 91, and wherein the electrodes 88 are electrically separated by a dielectric material such as a high molecular weight plastic. Note that this electrode assembly 89 may be spring biased toward the interior of the passage 18. Alternatively, various other mechanical, pneumatic, and/ or hydraulic assemblies may be provided for contacting the shoulder of a hog 14 in substantially the same place with one or more additional circuit-completing electrodes 88. Moreover, in another embodiment (FIG. 2), there is a single additional electrode 88 that is operatively (e.g. pivotally) attached to a housing 96 (at pivot point 114), wherein the housing 96 provides the ability for the electrode 88 to move synchronously with the hog 14 to which it is in contact up to a predetermined point and then rotates away from the hog after stunning so that the hog is easily disengaged from the electrode 88. In particular, the housing 96 is slidable along a rail 100 adjacent to the pathway 18. Further, the housing 96 is attached to an air cylinder assembly 104 for retracting the housing 96 and its attached electrode 88 to a position for providing an electrical current flow through a hog and the first stunning paddle 80. That is, the electrode 88 is moved just upstream of the initial stunning paddle 80 encountered by a hog 14 so that the electrode 88 encounters the hog's shoulder while the first stunning paddle 80 contacts the hog's head. Additionally, note that attached to the housing 96 and the electrode 88 is a electrode retract cylinder 108 for rotatably retracting the electrode 88 from contact with the hog 14. In particular, because the electrode retract cylinder 108 has an extendable shaft 112 attached to the rotatable electrode shaft at an opposite end from the electrode 88 so that when the extendable shaft is extended, the rotatable electrode shaft 90 rotates clockwise about a pivot point 114, the electrode 88 is allowed to move away from the hog 14 as shown by the dotted silhouette of the electrode shaft 90 in its rotated position away from the hog.

Accordingly, by initially positioning the electrode 88 so that it can contact the hog's shoulder throughout the process of the hog's head reiteratively contacting the stunning paddles 80, an electrical path through the hog's head and shoulder is provided between the electrode 88 and each successive stunning paddle 80 since the electrode 88 can move along with the hog 14 to the extent that rail 100 allows such movement. Thus, the electrical paths through the hog 14 go through a substantially same part of the hog's shoulder adjacent to the electrode 88's contact therewith. Note that this is particularly advantageous since any damage to the meat of the hog due to the electrical paths is localized between the head of the hog and the point-of-contact of the electrode 88. Note that this is advantageous because the electrode 88 remains in contact with substantially the same portion of the hog's shoulder throughout the stunning process, and thus, the electrical stunning currents through the hog are likely to only damage tissue that is between the stunning paddle 80 contact of the hog's head and the shoulder portion of the hog contacted by the electrode 88. It is therefore an object of the present invention to provide a method of stunning animals in a manner that reduces damage to valuable meat portions of the animal.

Figure 4:
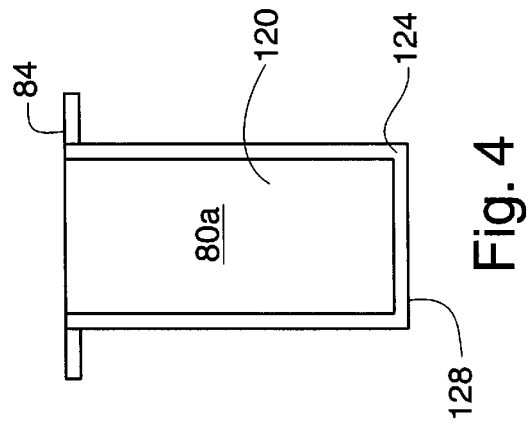
FIG. 4 shows an additional alternative embodiment of a stunning paddle of the present invention.

FIG. 4 shows an alternative embodiment of a stunning paddle (labeled 80a in this figure). This stunning paddle is different from that of the stunning paddle 80 of, for example FIG. 3, in that the paddle 80 of FIG. 3 is substantially a single sheet of conductive metal such as aluminum or steel, whereas the stunning paddle 80a of FIG. 4 includes at least one central portion 120 that is electrically conductive, and a dielectric portion 124 that prevents electrical current from flowing therethrough. Accordingly, the stunning paddle 80a is capable of providing a stunning current when the hog's head contacts the center portion 120, and if the paddle extends low enough into the passageway 18 so that the free ends 128 slide upon the back of a hog 14 as it moves past the pivot bar 84 for the stunning paddle, then the dielectric portion 124 prevents electrical stunning currents from entering the hog when the paddle is contacting the hog's back. Thus, an electrical potential can be maintained on each of the center portions 120 of the stunning paddles 80a by a substantially direct current without any switching electronics. The stunning process of the present embodiment has particularly simple electronics in that there is no need for electrical switches to activate and deactivate electrical potential to the stunning paddles 80a.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the invention. The embodiment described hereinabove is further intended to explain the best mode currently known of practicing the invention, and to enable others skilled in the art to utilize the invention as such or in other embodiments, and with the various modifications required by their particular application or uses of the invention. It is intended that the appended claims be construed to include alternative embodiments to the extent permitted by the prior art.

What is claimed is:

1. An animal stunning apparatus, comprising:

an animal confining restraint for restricting movement of an animal through a passageway so that the animal moves along a length of the passageway;

a collection of at least two electrodes that are each at least partially solid, each said electrode being provided within said passageway for contacting the animal, and said electrodes of the collection being spaced apart along the length of the passageway wherein said electrodes sequentially contact the animal as it moves through the passageway;

at least one additional circuit completing electrode for completing a corresponding electrical path with each of said electrodes of the collection;

a means for establishing, for each of said electrodes of the collection, said corresponding electrical path between said at least one additional electrode and the electrode of the collection, wherein each said corresponding electrical path includes a portion of the animal, and wherein as the animal moves along said passageway length, a first of the corresponding electrical paths commences before a second of the corresponding electrical paths commence wherein a duration said first corresponding electrical path overlaps with a duration of said second corresponding electrical path.

2. An animal stunning apparatus, comprising:

an animal confining restraint for restricting movement of an animal through a passageway so that the animal moves along a length of the passageway;

a collection of at least two electrodes that are each at least partially solid, each said electrode being provided within said passageway for contacting the animal, and said electrodes of the collection being spaced apart along the length of the passageway wherein said electrodes sequentially contact the animal as it moves through the passageway;

at least one additional circuit completing electrode for completing a corresponding electrical path with each of said electrodes of the collection;

a means for establishing, for each of said electrodes of the collection, said corresponding electrical path between said at least one additional electrode and the electrode of the collection, wherein each said corresponding electrical path includes a portion of the animal, and wherein as the animal moves along said passageway length, a first of the corresponding electrical paths commences before a second of the corresponding electrical paths commence, wherein said first and second corresponding electrical paths travel through substantially a same portion of the animal.

3. An animal stunning apparatus, comprising:

an animal confining restraint for restricting movement of an animal through a passageway so that the animal moves along a length of the passageway;

a collection of at least two electrodes that are each at least partially solid, each said electrode being provided within said passageway for contacting the animal, and said electrodes of the collection being spaced apart along the length of the passageway wherein said electrodes sequentially contact the animal as it moves through the passageway;

at least one additional circuit completing electrode for completing a corresponding electrical path with each of said electrodes of the collection;

a means for establishing, for each of said electrodes of the collection, said corresponding electrical path between said at least one additional electrode and the electrode of the collection, wherein each said corresponding electrical path includes a portion of the animal, and wherein as the animal moves along said passageway length, a first of the corresponding electrical paths commences before a second of the corresponding electrical paths commence, wherein said corresponding first and second electrical paths have first and second time interval durations, respectively, and said first and second electrical paths provide a continuous electrical current through the animal throughout a time interval including the first and second time intervals.

4. An animal stunning apparatus, comprising:

an animal confining restraint for restricting movement of an animal through a passageway so that the animal moves along a length of the passageway;

a collection of at least two electrodes that are each at least partially solid, each said electrode being provided within said passageway for contacting the animal, and said electrodes of the collection being spaced apart along the length of the passageway wherein said electrodes sequentially contact the animal as it moves through the passageway; at least one additional circuit completing electrode for completing a corresponding electrical path with each of said electrodes of the collection;

a means for establishing, for each of said electrodes of the collection, said corresponding electrical path between said at least one additional electrode and the electrode of the collection, wherein each said corresponding electrical path includes a portion of the animal, and wherein as the animal moves along said passageway length, a first of the corresponding electrical paths commences before a second of the corresponding electrical paths commence, wherein the animal contacts an electrode of the collection while in an orientation substantially identical to an orientation the animal is in when walking.

5. An animal stunning apparatus, comprising:

an animal confining restraint for restricting movement of an animal through a passageway so that the animal moves along a length of the passageway;

a collection of at least two electrodes that are each at least partially solid, each said electrode being provided within said passageway for contacting the animal, and said electrodes of the collection being spaced apart along the length of the passageway wherein said electrodes sequentially contact the animal as it moves through the passageway;

at least one additional circuit completing electrode for completing a corresponding electrical path with each of said electrodes of the collection;

a means for establishing, for each of said electrodes of the collection, said corresponding electrical path between said at least one additional electrode and the electrode of the collection, wherein each said corresponding electrical path includes a portion of the animal, and wherein as the animal moves along said passageway length, a first of the corresponding electrical paths commences before a second of the corresponding electrical paths commence, further including for each electrode of the collection, a corresponding dielectric portion operatively connected to said electrode so that said corresponding dielectric portion contacts the animal instead of said electrode, when another portion of the animal other than the animal's head moves past said electrode.

6. An animal stunning apparatus, comprising:

an animal confining restraint for restricting movement of an animal through a passageway so that the animal moves along a length of the passageway;

a collection of at least two electrodes that are each at least partially solid, each said electrode being provided within said passageway for contacting the animal, and said electrodes of the collection being spaced apart along the length of the passageway wherein said electrodes sequentially contact the animal as it moves through the passageway;

at least one additional circuit completing electrode for completing a corresponding electrical path with each of said electrodes of the collection;

a means for establishing, for each of said electrodes of the collection, said corresponding electrical path between said at least one additional electrode and the electrode of the collection, wherein each said corresponding electrical path includes a portion of the animal, and wherein as the animal moves along said passageway length, a first of the corresponding electrical paths commences before a second of the corresponding electrical paths commence, wherein at least one of said corresponding dielectric portions terminate one of said electrical paths.

7. A mammal stunning apparatus, comprising:

a passageway for maintaining the mammal in a predetermined orientation;

a collection of at least two electrodes, each said electrode being provided within said passageway for contacting the mammal, and said electrodes being spaced apart along the length of the passageway so that said electrodes sequentially the contact the mammal as it moves through the passageway;

one or more additional circuit-completing electrodes for completing, with each of said electrodes of the collection, a corresponding electrical path;

a means for establishing for each of said electrodes of the collection, said corresponding electrical paths between one of said additional electrodes and the electrode of the collection, wherein each said corresponding electrical path includes a portion of the mammal, and wherein as the mammal moves along said passageway length, a first of said corresponding electrical paths for a first electrode from the collection is established before a second of said corresponding electrical paths for a second electrode of the collection is established, said first electrode encountered by the mammal before said second electrode is encountered by the mammal, wherein said first and second electrodes are spaced apart no further than a length of the mammal's head along the length of the passageway.

8. A mammal stunning apparatus, comprising:

a passageway for maintaining the mammal in a predetermined orientation;

a collection of at least two electrodes, each said electrode being provided within said passageway for contacting the mammal, and said electrodes being spaced apart along the length of the passageway so that said electrodes sequentially the contact the mammal as it moves through the passageway;

one or more additional circuit-completing electrodes for completing, with each of said electrodes of the collection, a corresponding electrical path;

a means for establishing for each of said electrodes of the collection, said corresponding electrical paths between one of said additional electrodes and the electrode of the collection, wherein each said corresponding electrical path includes a portion of the mammal, and wherein as the mammal moves along said passageway length, a first of said corresponding electrical paths for a first electrode from the collection is established before a second of said corresponding electrical paths for a second electrode of the collection is established, said first electrode encountered by the mammal before said second electrode is encountered by the mammal, wherein said first and second corresponding electrical paths are established through the mammal while the mammal is in an upright walking orientation.

* * * * *